Feb. 21, 1967  L. A. WILLIAMS ETAL  3,305,470
ELECTROLYTIC SHAPING APPARATUS FOR SEQUENTIALLY REDUCING
THE THICKNESS OF AN ELONGATED WORKPIECE
Filed Jan. 2, 1963  4 Sheets-Sheet 1

INVENTORS:
Lynn A. Williams
Norbert A. Bruns
By Wupper, Gradolph & Love
Attys

INVENTORS:
Lynn A. Williams
Norbert A. Bruns
By Wupper, Gradolph & Love
Attys

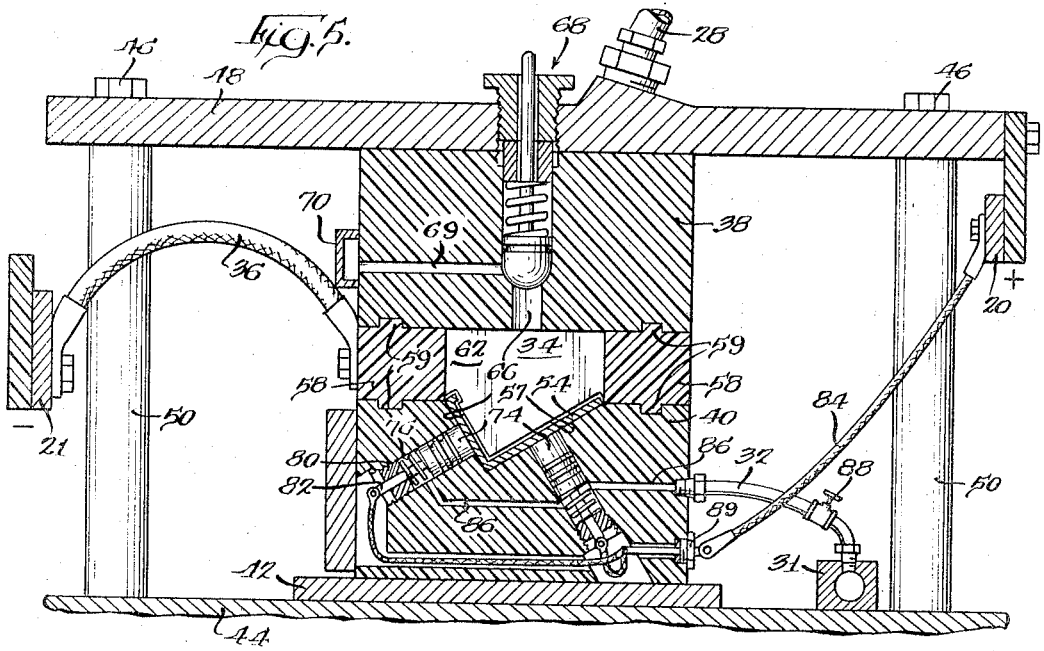
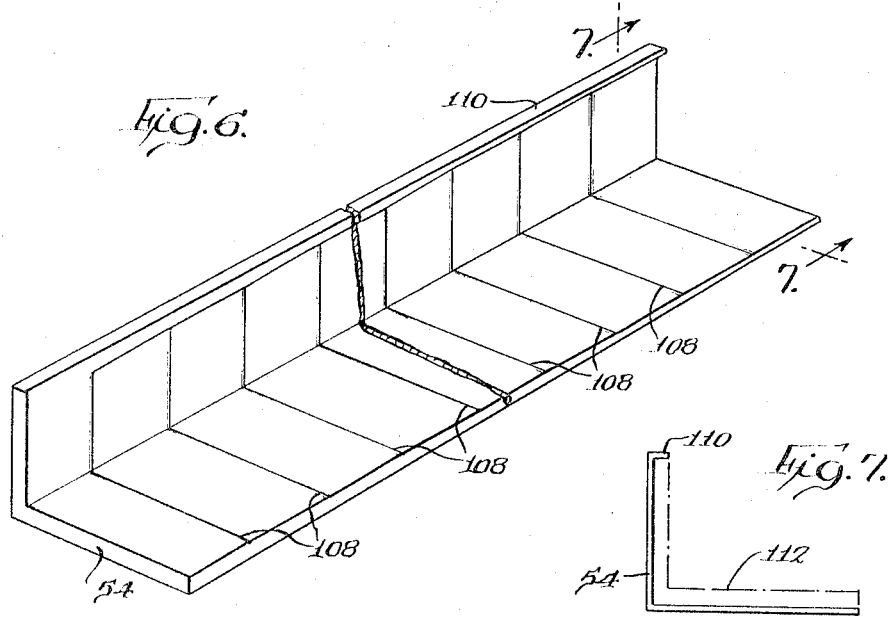

United States Patent Office 3,305,470
Patented Feb. 21, 1967

3,305,470
ELECTROLYTIC SHAPING APPARATUS FOR SE-
QUENTIALLY REDUCING THE THICKNESS OF
AN ELONGATED WORKPIECE
Lynn A. Williams, Winnetka, and Norbert A. Bruns,
Palatine, Ill., assignors to Anocut Engineering Com-
pany, Chicago, Ill., a corporation of Illinois
Filed Jan. 2, 1963, Ser. No. 249,045
6 Claims. (Cl. 204—211)

This invention relates in general to the removal by the electrolytic process of material from an electrically conductive and electrochemically erodible workpiece. In particular, it relates to an electrolytic extrusion apparatus and process whereby material is removed from an elongate workpiece.

As used in the following specification, the term "extrusion" is used in its broadest sense to describe the act of pushing through, such as pushing through a die or a series of dies.

Frequently it is desirable to shape an elongate workpiece so that its transverse section or contour is the same and uniform throughout its length. If the piece is not too long, then the shaping may be accomplished by placing the workpiece in or closely adjacent electrodes such as those shown in the copending application of Lynn A. Williams, Serial No. 187,902, filed April 16, 1962, entitled, "Electrolytic Removal Apparatus and Method." However, such workpieces may be several feet long and may be of various lengths. Under these circumstances it is not economically feasible to use arrangements such as those shown in the aforementioned application.

Equipment for removing material from and contouring a face of a moving workpiece is shown and described in Lynn A. Williams Patent No. 3,058,895, dated October 16, 1962, entitled "Electrolytic Shaping." However, this disclosure is directed primarily to an operation on one side or face of the workpiece, and it contemplates but is not necessarily limited to an operation on a relatively short workpiece.

The apparatus and method of this invention employ the method and principle of electrolytic material removal disclosed and claimed in the aforesaid Patent No. 3,058,895. In this method, the workpiece to be shaped is brought into close spacing relationship with an electrode having a conductive working face to define a work gap of a few thousandths of an inch therebetween. A fluid electrolyte is pumped to and through the work gap at a greatly superatmospheric pressure in the range of 40 to 350 p.s.i. measured at the entry to the work gap. Simultaneously, a low voltage (4 to 25 volts), high density (100 to 8,000 amperes per square inch) direct current is passed between the workpiece and the electrode in a sense to make the workpiece anodic. It is preferable that the work gap spacing be maintained constant in the range up to about .015 inch, and thus the electrode is arranged to be relatively movable toward and away from the workpiece.

This method is utilized in the extrusion method of this invention wherein successive adjacent incremental portions of the elongate workpiece are brought into juxtaposition with one or more electrodes, sometimes referred to hereinafter as electrode dies. One problem encountered in such operation is connecting the workpiece into the positive side of the power supply so as to minimize current losses which arise due to progressively reducing the cross sectional area of the workpiece. This problem is particularly severe where the cross sectional area is very substantially reduced and the workpiece becomes quite thin in its finished portion.

Another problem is the generation of heat of electrolysis in the gap between the workpiece and the electrode. By properly regulating the amount of material removed for any given electrode working face area the problem can be brought under control. Where the workpiece is of heavy section, there is little likelihood of damage to either the electrode or the workpiece, but if the workpiece is of thin section excessive heat may result in damaging warpage of the workpiece.

These and other problems have been met and overcome by the apparatus and method of the present invention, the principal object of which is to provide a novel apparatus and method for the electrolytic extrusion of electrically conductive and electro-chemically erodible workpieces.

In its preferred form, the apparatus includes a series of electrode dies along the path of travel of the workpiece, with each electrode eroding a fraction of the total amount of material to be removed from the workpiece. Thus, the workpiece is kept in movement while the material is removed in a series of successive steps so that the time necessary to shape and form the piece is reduced to a minimum and the amount of material removed in each step is kept under control. This permits the dimensions of the workpiece to be held within smaller tolerances and results in a more even finish. By successively bringing incremental portions of the workpiece into the electric circuit as the workpiece moves through the electrode series, the current density is maintained constant irrespective of the smaller cross sectional area of the workpiece as the material is removed, thereby accurately controlling the rate and amount of material removal by each electrode.

It is therefore another object of the present invention to provide a novel electrolytic extrusion apparatus and method wherein the workpiece is passed through or past a series of electrodes.

Another object is to provide a novel electrolytic extrusion apparatus wherein successive incremental portions of the workpiece are connected into the electrolyzing electric circuit as the workpiece is passed through or past a series of electrodes.

Other objects and advantages of the invention will become apparent from the following specification, taken in conjunction with the accompanying drawings, wherein FIG. 1 is a general perspective view of the work table assembly and electrode assembly, partly broken into section;

FIG. 5 is a transverse sectional view, taken along the lines 5—5 of FIG. 2, looking in the direction of the arrows;

FIG. 6 is a general perspective view of a typical workpiece, consisting of an L-shaped channel member indicating the manner in which it is shaped by the electrolytic extrusion process of this invention; and FIG. 7 is a transverse sectional view, taken through the line 7—7 of FIG. 6, indicating the original shape of the workpiece in dot-dash lines.

Figure 1:
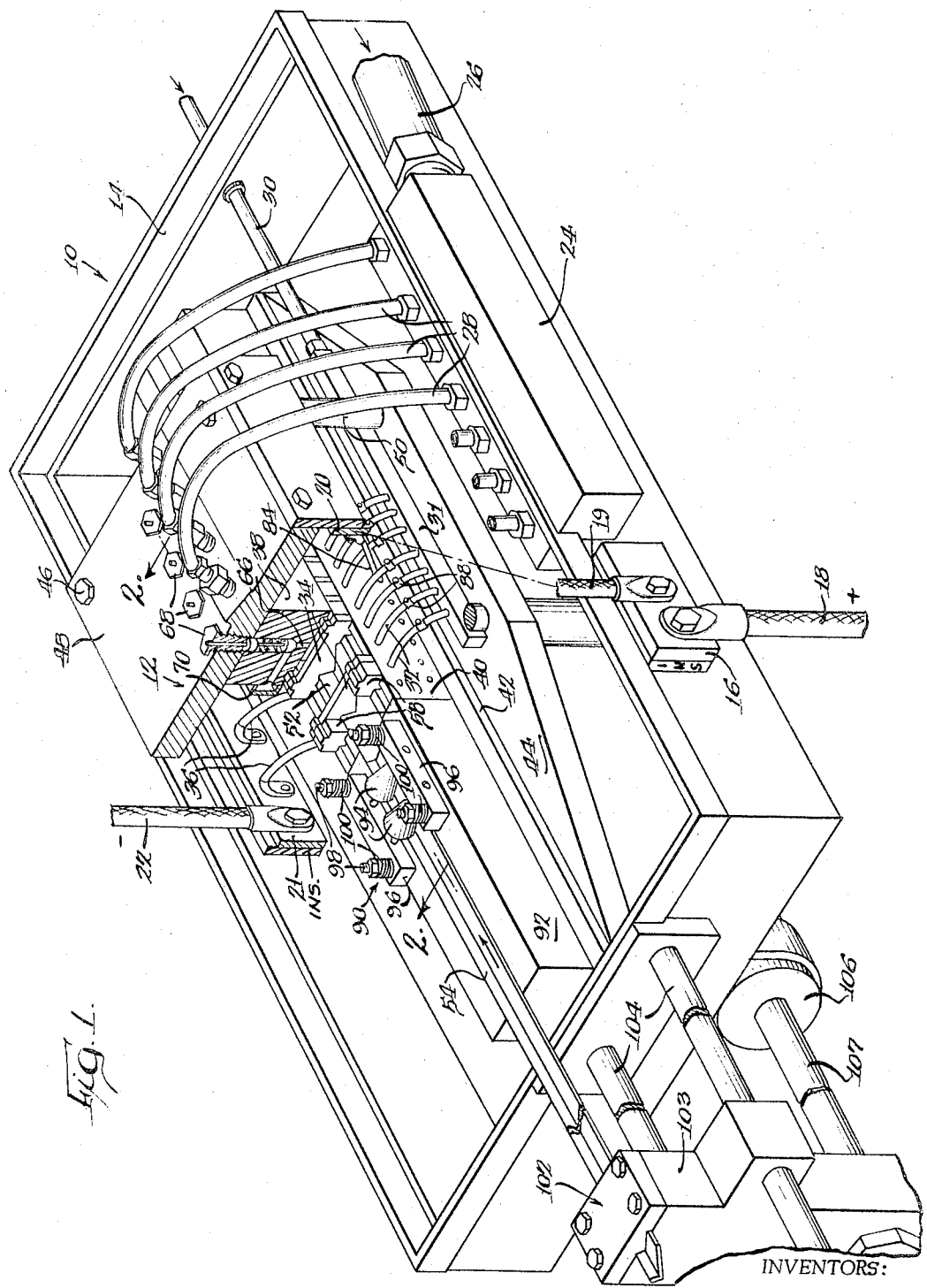

Referring to the drawings, and particularly to FIG. 1, a work table assembly is indicated generally by the reference character 10. It supports an electrode die assembly 12 and is provided with a housing 14 to prevent electrolyte splatter outside the work area.

The housing 14 carries a terminal block 16 connected to the positive terminal of a power supply (not shown) by a cable 18 and this block is connected via a cable 19 to a bus bar 20 adjacent one side of the electrode die assembly 12. Another terminal block or bus bar 21, also carried by the housing 14 in a position adjacent the other side of the electrode die assembly 12, is connected by a cable 22 to the negative terminal of the power supply. The power supply may be of the type disclosed in the copending application of Lynn A. Williams and James E. Davis, Serial No. 863,246, filed December 15, 1959, now abandoned, and capable of delivering a high density electrolyzing direct current of between 4 volts and 25 volts.

The housing 14 also carries a manifold assembly 24 which contains a passageway through which electrolyte from a hose 26 is dispensed to a series of feeder hoses 28 connected to the electrode die assembly 12. The electrolyte is pumped through the hose 26 at a pressure of 40 to 350 p.s.i. and the capacities of the hose 26, manifold 24, and feeder hoses 28 are such as to minimize pressure losses. In addition, an air inlet hose 30 is provided, and it supplies air under pressure through a manifold 31 to respective air feeder hoses 32 connected to the electrode die assembly 12.

Figure 3:
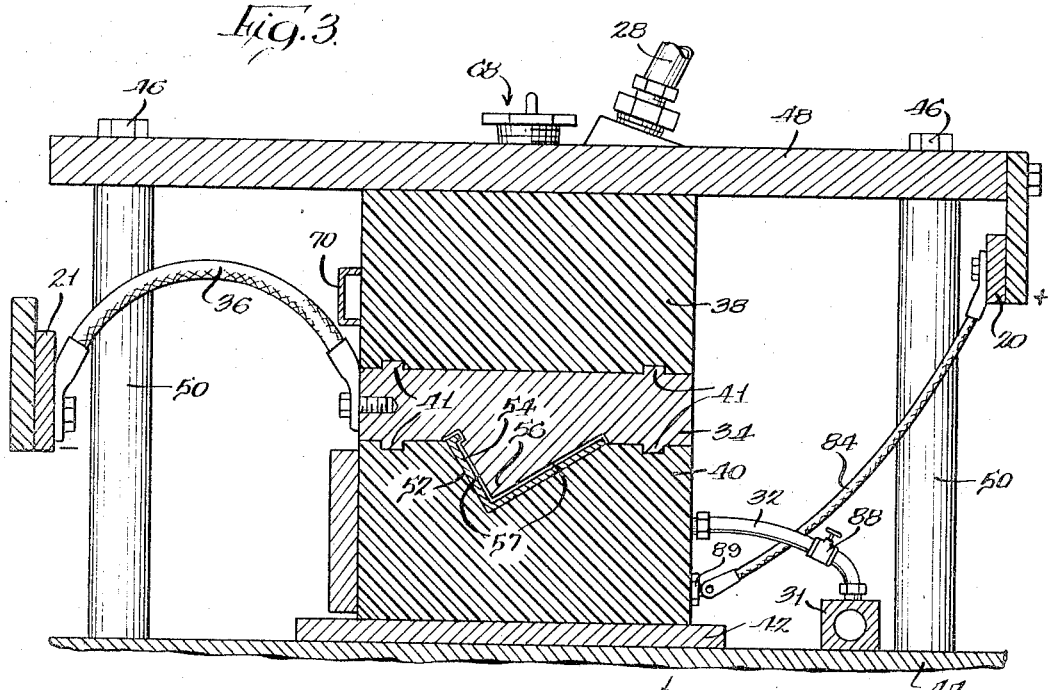
FIG. 3 is a transverse sectional view, taken along the lines 3—3 of FIG. 2, looking in the direction of the arrows.

The electrode die assembly 12 comprises a series of spaced apart electrodes 34 each connected to the negative terminal block 21 by cables 36, and thus the negative terminal of the power supply from the terminal block 21 by the cable 22. The electrodes 34 are held between an upper insulating block 38 and a lower insulating block 40 of substantially the same width as the electrodes, and arranged with the longitudinal axes of the blocks 38 and 40 parallel to the very much shorter longitudinal axes of the individual electrodes 34. Upwardly and downwardly projecting lugs 41 (see FIG. 3) on the electrodes 34 engage correspondingly shaped recesses in the blocks 38 and 40 properly to seat and position the electrodes.

The blocks 38 and 40 are preferably of epoxy bonded glass laminate with the lower block bonded to a support plate 42 with epoxy resin. The blocks 38 and 40 are, in turn, clamped to a table 44 by means of bolts 46 and a top plate 48, with the latter being supported on posts 50.

Figure 2:
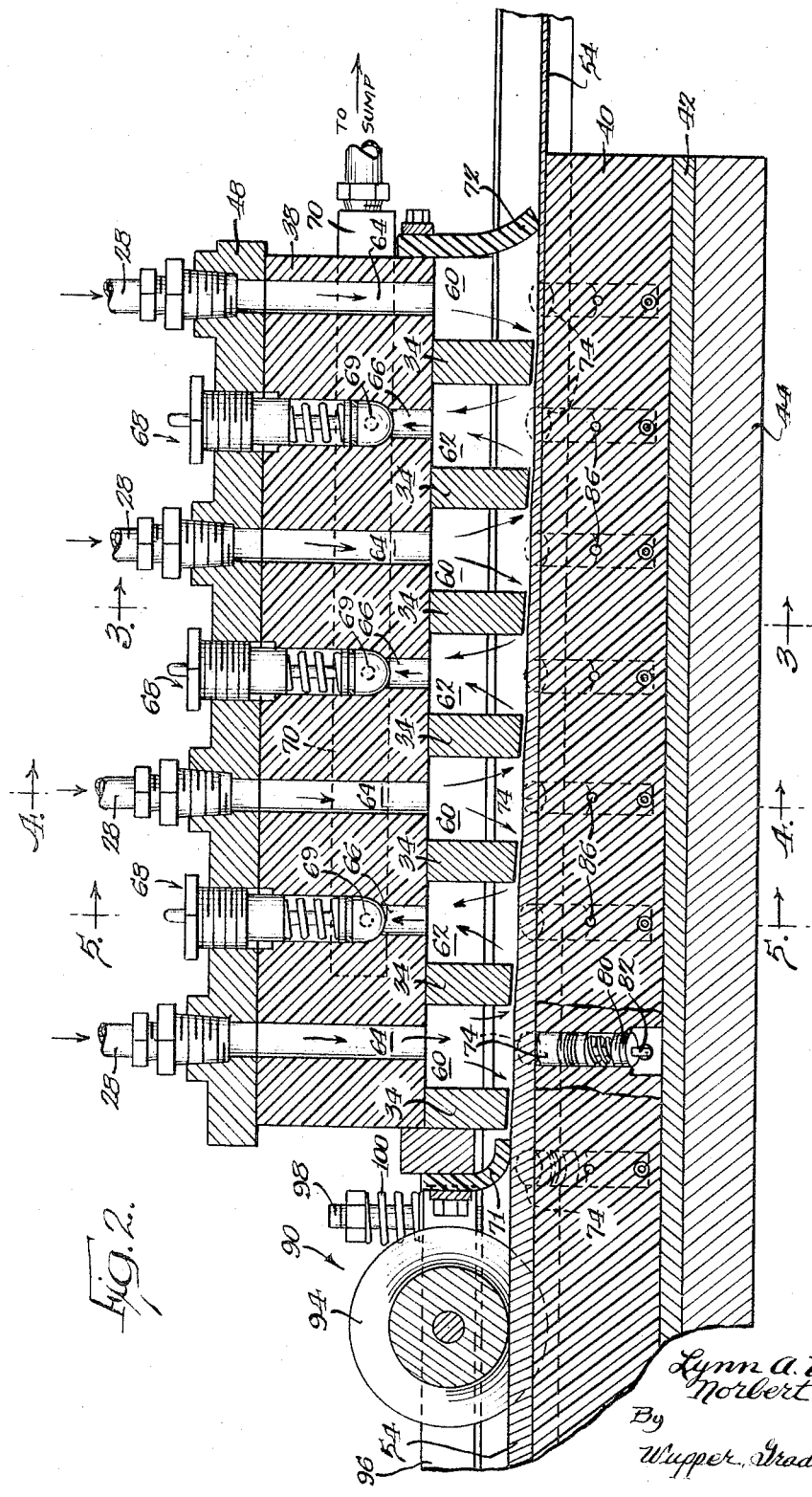
FIG. 2 is a longitudinal sectional view, taken along the lines 2—2 of FIG. 1, looking in the direction of the arrows.

The lower block 40 is provided with an elongate L-shaped recess 52 disposed longitudinally of the block 40. The walls of this recess 52 are adapted to support a correspondingly shaped elongate metal workpiece 54 for passage beneath the electrodes 34. The electrodes 34 are each provided with a depending portion 56 (with FIG. 3) having working faces 57 (see FIG. 3) beneath which the workpiece 54 is fed, with the depending portion 56 of each successive electrode 34 arranged so that the respective working faces 57 thereof are in a more closely spaced relationship with the walls of the guide recess 52 than the corresponding working faces 57 of the preceding electrode 34. Each working face 57 is slightly angled so that the space between it and the guide surface of the recess 52 at the entry to the space, the left end as seen in FIG. 2, is slightly greater than the exit therefrom. The angle is very slight, being in the order of about 45′ to 2½° and preferably about 1½°, and the difference in spacing is correspondingly small. For example, if the electrode 34 is one inch long in the direction of workpiece movement, the difference in entry and exit spaces would be about .025 inch. As the workpiece 54 moves successively past each electrode working face 57 it would seem theoretically to be closer to the working face at the exit from the space than at the entry. However, electrolytic workpiece removal occurs opposite the entirety of the working face, and by regulating the workpiece feed rate a substantially uniform spacing of not more than about .015 inch may be maintained between the workpiece 54 and the successive electrode working faces 57 as the workpiece is progressively eroded in passing through the electrode die assembly 12. In the example above given material in the thickness of .025 inch would be removed from the workpiece as it passes the electrode 34.

The working face angles of all the electrodes 34 in an assembly preferably should be the same, and the exit space between the working face 57 and the workpiece guide at one electrode should be the same as the entry space at the next successive electrode.

The depending electrode portions 56 are formed to be complementary with a desired shape to be imparted to the workpiece so that each will erode a correspondingly shaped portion of the workpiece and thereby control its final configuration. While an angle shaped workpiece is shown, it is submitted that an almost infinite variety of shapes may be formed with this apparatus upon the selection of the proper guide and electrode shapes.

Figure 4:
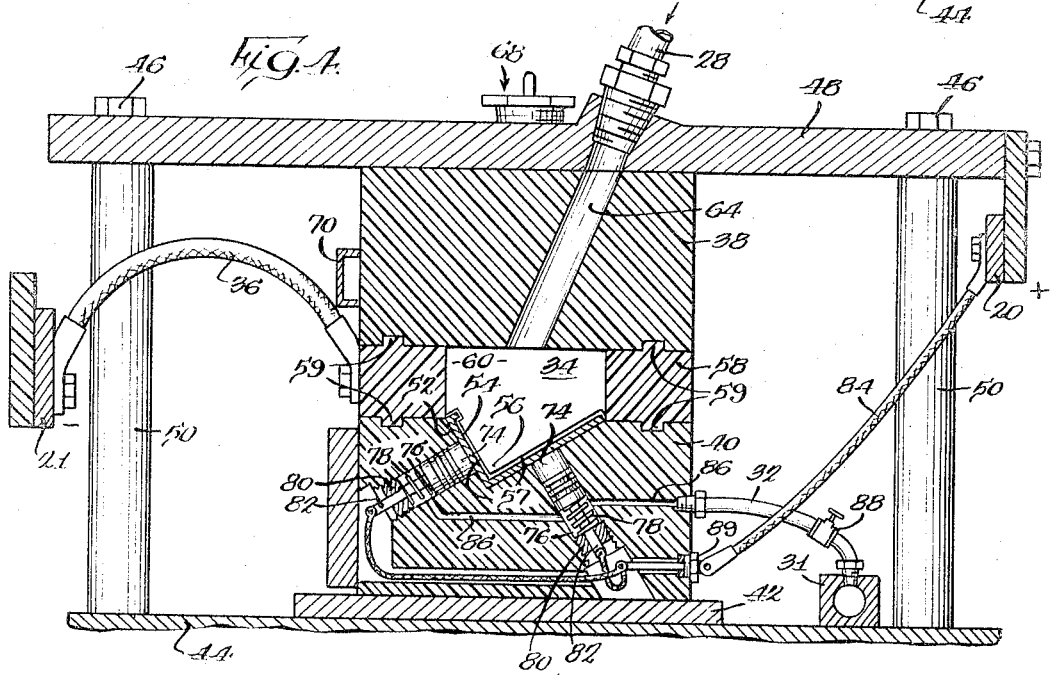
FIG. 4 is a transverse sectional view, taken along the lines 4—4 of FIG. 2, looking in the direction of the arrows.

Also located between the insulating blocks 38 and 40 and between the electrodes, are pairs of insulating spacer blocks 58 aligned along opposite edges of the recess 52, as seen in FIG. 4, and having lugs 59 to insure their alignment with the recess. The spacers 58 and the electrodes 34, together with the blocks 38 and 40, define alternating electrolytic inlet chambers 60 and exit chambers 62 as seen in FIG. 2. Electrolyte is pumped into the chambers 60 through angularly disposed entrance passageways 64 formed in the upper block 38 and which communicate with the manifold 31 through the feeder conduits 28.

The electrolyte in each chamber 60 is pumped into the adjacent exit chamber or chambers 62 through the work gap between the working faces 57 of the intervening electrodes 34 and the workpiece 54, and exits from the chambers 62 through exit passageways 66 formed in the upper block 48, as best seen in FIGS. 2 and 5. Each passageway 66 is fitted with a check valve assembly 68 which prevents the passage of electrolyte for passageway 66 until the pressure in passageway 66 and chambers 60 and 62 has reached a predetermined superatmospheric value, which appears to contribute to a smoother and more polished finish on the workpiece. For example, if the electrolyte inlet pressure is measured at 150 p.s.i., then the check valves 68 might be set to open under a pressure of 50 p.s.i., and the pressure drop through the work gap would be 100 p.s.i. These are merely typical pressures. The check valve assemblies 68 are adjustable so that the outlet pressure, as well as the inlet pressure, may be regulated. The electrolyte from passageways 66 at the outlet side of the check valves 68 flows through the passageways 69 in the block 38 and is collected in a common return conduit 70.

It will be observed that electrolyte is pumped to all of the inlet chambers 60 simultaneously, and, since during the initial stages of shaping, the workpiece 54 will not have passed beneath all of the electrodes 34, some electrolyte will be pumped through the exit chambers 62 and passageways 66 and 69 without doing any work but the exit valve assemblies 68 will prevent undesired pressure losses in the system.

The workpiece entrance to the electrode die assembly is guarded by a wiper 71 which when no workpiece is present seals the space under the left electrode 34 (FIG. 2) and prevents the escape of electrolyte before the workpiece enters the die assembly and after the trailing end of the workpiece has entered the die assembly. The workpiece exit from the electrode die assembly 12 is similarly guarded by a wiper 72 which closes the exit from the die assembly and later rides on the finished surface of the workpiece 54. Both wipers 71 and 72 prevent excessive loss of electrolyte pressure and spraying of electrolyte.

In order to complete the electric circuit through the workpiece 54, electrolyte, and electrodes 34, and accomplish erosion of the workpiece, a series of spaced apart contact elements or brushes 74 are provided for engagement with each leg of the workpiece. Engagement of the brushes 74 at different positions along the workpiece enables a more uniform distribution of current through the varying cross section of the workpiece as it is eroded. The brushes 74 are slidably located in passageways 76 formed in the lower block 40 and intermediate the electrodes 34 with the first brush 74 preceding the first electrode 34, thereby to enable the workpiece to be connected into the elertric circuit prior to its coming into electrolytic shaping position.

The brushes 74 are normally prevented from moving into the recess 50 and thus into the path of movement of the workpiece by means of tension springs 78 retained by annular plugs 80. Each brush 74 is provided with an extension 82 projecting through the plug 80, whereby an electrical connection to the positive bus 20 of the power supply may be established by a cable 84 extending between the bus 20 and the bus extension 82.

To overcome the restraining bias of the springs 78 and to project each brush 74 into engagement with the workpiece after it has passed over the brush, air under pressure is supplied to the underside of the brush 74 in the space between the brush 74 and the plug 80. The air under pressure is fed through passageways 86 in the block 40 communicating with the feeder conduits 32, with the supply of air being controlled by such means as valves 88 located in the conduits 32. The valves 88 may, for example, either be opened under electrical, pneumatic, or hydraulic control in response to visual observation of the movement of the workpiece 54, or in response to some mechanical or electrical sensing apparatus determining the position of the workpiece. Thus, the valves 88 are opened in sequence as the workpiece traverses sequentially the passageways 76, brushes 74, and electrodes 34 to move the individual brushes 74 into engagement with the workpiece 54 immediately after the workpiece traverses the brush position.

It should be noted that the entry of each electrical cable 84 is through a sealing plug 89 to prevent the loss of air pressure projecting the brushes 74 into engagement with the workpiece.

A guide roller assembly 90 is also provided accurately to guide the workpiece 54 into the die assembly 12. It is also supported on the table 44 and on a block 92, which may be an extension of the block 40 and which is provided with a recess similar to the recess 52. The roller assembly comprises a pair of guide rollers 94 journaled in opposing bars 96 disposed parallel to the workpiece 54. The bars 96 in turn are carried between posts 98 and biased by springs 100 to maintain a desired degree of tension on the workpiece 54.

The workpiece is moved through the guide roller assembly 90 and the die assembly 12 by means of a workpiece feed assembly 102 which includes a two part workpiece clamp 103 adapted to be clamped to one end of the workpiece. The feed assembly 102 is mounted for reciprocation on a pair of guide bars 104 and is moved by an air pressure operated piston-cylinder combination 106 through a connecting rod 107. This is one of a number of feed arrangements possible for the workpiece.

The operation of the electrolytic extrusion apparatus of this invention is essentially as follows. The workpiece feed assembly 102 is moved as far leftwardly (FIG. 1) as possible, and the workpiece 54 is placed in position and secured by the two part clamp 103. The leading end of the workpiece is introduced under the guide rollers 94 and advanced toward the electrode 34 at the entry end of the die assembly 12 (left end, FIG. 2) and under the wiper 71. The electrolyte pump is turned on, and electrolyte is pumped under pressure to and through the inlet chambers 60, past the working faces 57 of the electrodes 34, through the exit chambers 62, and through the outlet passageways 66 and 69, opening the back pressure regulating check valves 68. As soon as it is observed that the flow of electrolyte has been established, and this can be determined from the outlet from the return conduit 70, the power supply is turned on and the feed piston-cylinder combination energized to move the feed assembly 102 and the workpiece 54 toward the electrode die assembly 12. Preferably the first brushes 74 (those to the left in FIG. 2) in the positive side of the electrolyzing electric circuit will have been engaged with the workpiece 54 by either manual or automatic controls for the appropriate brush prior to energizing the electric circuit. This will prevent arcing or sparking between the workpiece and the brushes when the power supply is turned on.

With the apparatus thus conditioned, the workpiece 54 is advanced toward and under the first electrode 34, and the electrolyzing circuit is completed from the positive terminal of the power supply, cable 18, terminal block 16, cable 19, bus bar 20, feeder cable 84, brush extensions 82, brushes 74, workpiece 54, electrolyte, electrode 34, cable 36, negative bus bar 21, cable 22, and negative terminal of the power supply. As the workpiece 54 is advanced past the working faces 57 of the electrode 34, material is electrochemically eroded from the workpiece.

The leading end of the workpiece enters the first electrolyte inlet chamber 60 which is flooded with electrolyte. It passes the brushes 74, and the latter are projected against the undersides of the workpiece opposite the surfaces being eroded. Since the surfaces of the brushes and the undersides of the workpiece are covered with electrolyte, and the workpiece is at the same potential as the brushes, there is no tendency for the electric current to arc or spark as the brushes are projected into contact with the workpiece.

The workpiece is advanced at a constant rate past the successive electrodes 34 and sets of brushes 74, and the surface of the workpiece is incrementally eroded to produce slight steps 108 as indicated in FIG. 6. As each set of brushes is reached and covered, the brushes are projected against the underside of the workpiece. The upward pressure exerted by the brushes is insufficient to move the workpiece 54 from the guide recess as it is held there by the force of the guide rollers 94 and the pressure exerted over the entire upper surface of the workpiece by the electrolyte under pressure in the inlet chambers 60, in the outlet chambers 62, and in the work gaps, and therefore the workpiece is not contacted with any of the electrodes.

The successive electrodes 34 each erode a corresponding amount of metal from the surface of the workpiece 54. This apparatus also enables a complex configuration to be formed on the workpiece as indicated by the lip 110. The broken line 112 in FIG. 7 indicates that a substantial amount of material may be removed from the workpiece in successive steps in a minimum time period, while enabling close tolerances and an extremely smooth finish to be obtained on the workpiece.

At the exit end of the electrode die assembly 12 the workpiece 54 moves the wiper 72 to the FIG. 2 position to enable the finished workpiece to leave the apparatus. In shaping long workpieces which must be finished from end to end, the feed unit preferably should have means to engage the leading portion of the workpiece so that the feed clamp can be released and the workpiece pulled through the die assembly. As the trailing edge of the workpiece enters the die assembly, the wiper 71 moves to close the entry thus preventing the escape of electrolyte.

Another method of feeding the workpiece involves the use of powered feed rollers at the entry and exit ends of the apparatus, and such rollers could also hold the workpiece in the guideway.

From the foregoing description it will be clear that the objectives claimed for this invention have been obtained by the apparatus and method disclosed.

While a preferred embodiment of the electrolytic extrusion apparatus and method constituting this invention has been shown and described, it will be apparent that numerous modifications and variations thereof may be made therein without departing from the underlying principles of the invention. It is therefore desired, by the following claims, to include within the scope of the invention all such variations and modifications by which substantially the results of this invention may be obtained through the use of substantially the same or equivalent means.

What is claimed as new and desired to be secured by United States Letters Patent is:

1. Apparatus for the electrolytic extrusion of an elongate electrically conductive and electrochemically erodible workpiece, comprising in combination, a series of spaced apart electrodes each having at least one conductive working face, electrically nonconductive guide recess means defining a planar supporting surface for supporting a movable workpiece in closely spaced relationship with all of said electrode working faces to define narrow work gaps therebetween, means for moving the workpiece past each of said electrode working faces in sequence, said working faces defining a plane converging with the plane defined by said guide recess means, means for pumping an electrolyte between each electrode working face and the workpiece, a series of brushes spaced along the path of workpiece movement and adapted to be engaged with the workpiece, means for projecting each brush sequentially into engagement with the workpiece as the latter reaches its position, and a source of low voltage direct current connected to said brushes and said electrodes in a sense to make said electrodes cathodic, whereby each electrode is adapted electrolytically to erode successive portions of the workpiece as the workpiece is moved past said working faces.

2. Apparatus for the electrolytic extrusion of an elongate electrically conductive and electrochemically erodible workpiece, comprising in combination, a series of spaced apart electrodes connected in common to a source of current of one polarity, electrically nonconductive guide recess means defining a planar supporting surface for supporting a workpiece in closely spaced relationship with all of said electrodes to define narrow work gaps therebetween, said working faces defining a plane converging with the plane defined by said guide recess means, means for moving the workpiece past each of said electrodes in sequence, means enclosing the spaces between adjacent electrodes to define alternate electrolyte inlet and exit chambers therebetween, an inlet opening to each inlet chamber, an exit passageway from each exit chamber, a check valve in each exit passageway, means connected to said inlet openings for pumping an electrolyte to and through said inlet chambers, the work gaps, and said exit chambers and passageways, said check valves placing a back pressure on the electrolyte, and a series of brushes spaced along the path of workpiece movement and adapted sequentially to be engaged with the workpiece and connected to a source of current of another polarity, whereby each electrode is adapted electrolytically to erode successive portions of the workpiece as the workpiece is moved therepast.

3. Apparatus for the electrolytic extrusion of an elongate electrically conductive and electrochemically erodible workpiece, comprising in combination, a series of spaced apart electrodes each having at least one conductive working face, electrically nonconductive guide recess means defining a planar supporting surface for supporting a movable workpiece in closely spaced relationship with all of said electrode working faces to define narrow work gaps therebetween, said working faces defining a plane converging with the plane defined by said guide recess means, means for moving the workpiece past each of said electrode working faces in sequence, means enclosing the spaces between adjacent electrodes to define alternate electrolyte inlet and exit chambers therebetween, an inlet opening to each inlet chamber, an exit passageway from each exit chamber, an electrolyte back pressure regulating check valve in each exit passageway, means connected to said inlet openings for pumping an electrolyte to and through said inlet chambers, the work gaps, and said exit chambers and passageways, said check valves placing a back pressure on the electrolyte, a series of brushes spaced along the path of workpiece movement and adapted to be engaged with the workpiece, means for projecting each brush sequentially into engagement with the workpiece as the latter reaches its position, and a source of low voltage direct current connected to said brushes and said electrodes in a sense to make said electrodes cathodic, whereby each electrode is adapted electrolytically to erode successive portions of the workpiece as the workpiece is moved therepast.

4. Apparatus for the electrolytic extrusion of an elongate electrically conductive and electrochemically erodible workpiece, comprising in combination, a series of spaced apart electrodes each having at least one conductive working face, electrically nonconductive guide recess means defining a planar supporting surface for supporting a workpiece in spaced apart relationship with all of said electrode working faces to define narrow work gaps therebetween and for moving the workpiece past each of said working faces in sequence, said electrode working faces defining a plane converging with the plane defined by said guide recess means, means for pumping an electrolyte through the work gaps between each electrode working face and the workpiece, a series of brushes spaced along the path of workpiece movement and adapted sequentially to be engaged with the workpiece, means for projecting each brush sequentially into engagement with said workpiece as the latter reaches its position, and a source of low voltage direct current connected to said brushes and said electrodes in a sense to make said electrodes cathodic, whereby each electrode is adapted electrolytically to erode successive portions of the workpiece as the workpiece is moved past said working faces.

5. Apparatus for the electrolytic extrusion of an elongate electrically conductive and electrochemically erodible workpiece, comprising in combination, a series of spaced apart electrodes each having at least one conductive working face, electrically nonconductive guide recess means defining a planar supporting surface for supporting a workpiece in spaced apart relationship with all of said electrode working faces to define narrow work gaps therebetween and for moving the workpiece past each of said working faces in sequence, said working faces defining a plane converging with the plane defined by said guide recess means having an angle within the range of about ¾° to 2½° toward the direction of workpiece movement, means for pumping an electrolyte through the work gaps between each electrode working face and the workpiece, a series of brushes spaced along the path of workpiece movement and adapted sequentially to be engaged with the workpiece, means for projecting each brush sequentially into engagement with said workpiece as the latter reaches its position, and a source of low voltage direct current connected to said brushes and said electrodes in a sense to make said electrodes cathodic, whereby each electrode is adapted electrolytically to erode successive portions of the workpiece as the workpiece is moved past said working faces.

6. Apparatus for the electrolytic extrusion of an elongate electrically conductive and electrochemically erodible workpiece, comprising in combination, a series of spaced apart electrodes each having at least one conductive working face, electrically nonconductive guide recess means defining a planar supporting surface for supporting a workpiece in spaced apart relationship with all of said electrode working faces to define narrow work gaps therebetween and for moving the workpiece past each of said working faces in sequence, said working faces defining a plane converging with the plane defined by said guide recess means having an angle of about 1½° toward the direction of workpiece movement, means for pumping an electrolyte through the work gaps between each electrode working face and the workpiece, a series of brushes spaced along the path of workpiece movement and adapted sequentially to be engaged with the workpiece, means for projecting each brush sequentially into engagement with said workpiece as the latter reaches its position, and a source of low voltage direct current connected to said brushes and said electrodes in a sense to make said electrodes cathodic, whereby each electrode is adapted electrolytically to erode successive portions of the workpiece as the workpiece is moved past said working faces.

References Cited by the Examiner

UNITED STATES PATENTS

| | | | |
|---|---|---|---|
| 2,307,928 | 1/1943 | Hogaboom | 204—206 |
| 2,708,181 | 5/1955 | Holmes et al. | 204—206 |
| 2,742,417 | 4/1956 | Shanley | 204—211 |
| 3,002,907 | 10/1961 | Williams | 204—143 |
| 3,051,638 | 10/1962 | Clifford et al. | 204—143 |
| 3,058,895 | 10/1962 | Williams | 204—143 |
| 3,095,364 | 6/1963 | Faust et al. | 204—143 |
| 3,214,361 | 10/1965 | Williams | 204—224 |

FOREIGN PATENTS 806,805   12/1958   Great Britain.

JOHN H. MACK, *Primary Examiner.*

R. K. MIHALEK, *Assistant Examiner.*